Jan. 15, 1935.  H. DICKER  1,987,993
ICE CREAM CONE
Filed Dec. 6, 1933   2 Sheets—Sheet 1

INVENTOR.

Jan. 15, 1935. H. DICKER 1,987,993
ICE CREAM CONE
Filed Dec. 6, 1933 2 Sheets-Sheet 2

*Hyman Dicker*
INVENTOR.

Patented Jan. 15, 1935

1,987,993

UNITED STATES PATENT OFFICE 1,987,993

ICE CREAM CONE

Hyman Dicker, Jersey City, N. J.

Application December 6, 1933, Serial No. 701,132

1 Claim. (Cl. 99—10)

This invention relates to ice cream cones; and in the accompanying drawings.

One object of my invention is to make an edible receptacle, or cup for ice cream dispensing which includes the feature whereby the receptacle or cup can rest on its own legs without being braced.

A second object of my invention is to make an edible receptacle or cup for ice cream dispensing which will enable the person dispensing the ice cream to set the cup or receptacle, containing the ice cream, in an upright position upon counter or table, without having to put it directly in the hand of the purchaser, as is the common practice now.

A third object of my invention is to make an edible cup or cone, neat and attractive in appearance, and handy for the dispenser and purchaser.

A fourth object of my invention is to make an edible cup or cone shaped to permit the nesting of one cup or receptacle in another for purposes of economical packing in boxes for distribution to jobbers and retailers.

Other objects and useful features of my invention will appear as I proceed with my description.

Figure 2:
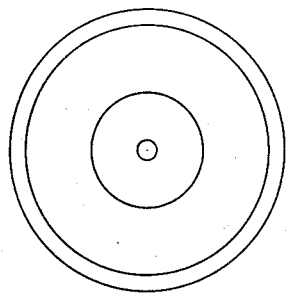
Fig. 2 represents a top plan view of Fig. 1.
Figure 1:
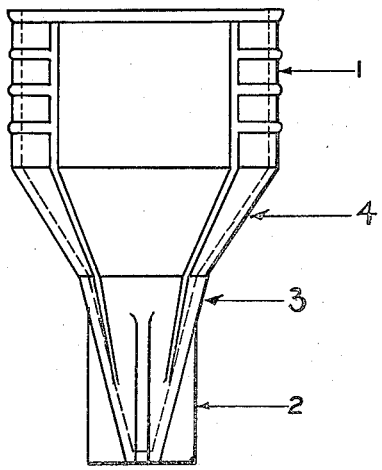
Fig. 1 represents a side elevation of my improved ice cream cup.
Figure 3:
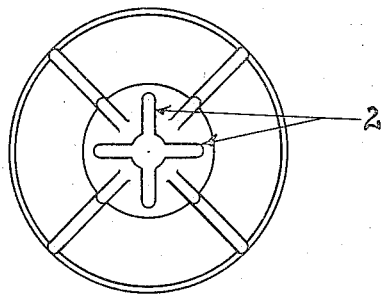
Fig. 3 represents a bottom plan view of Fig. 1.
Figure 5:
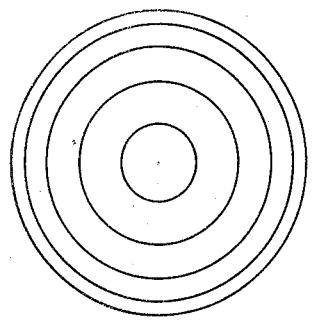
Fig. 5 represents a top plan view of Fig. 4.
Figure 8:
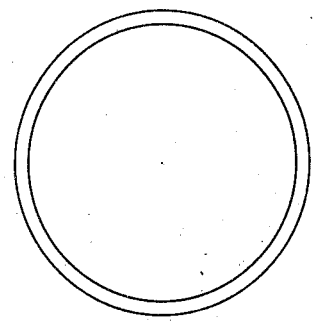
Fig. 8 represents a top plan view of Fig. 7.
Figure 4:
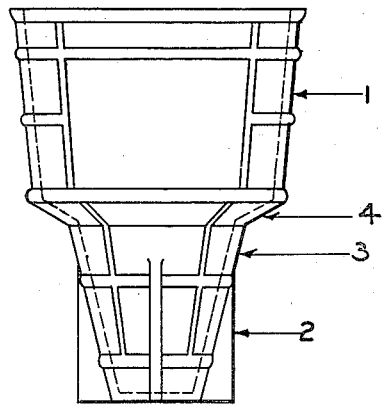
Fig. 4 represents a side elevation of a modified form of my improved ice cream cup.
Figure 7:
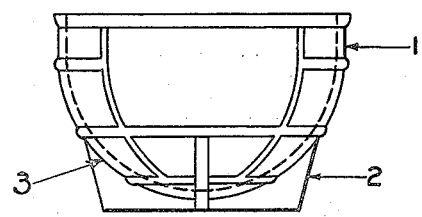
Fig. 7 represents a side elevation of another modified form of my improved ice cream cup.
Figure 6:
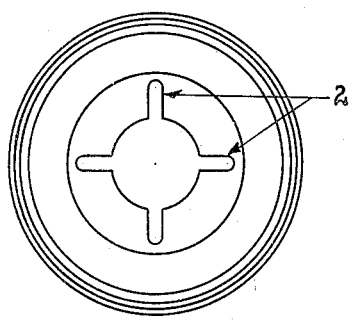
Fig. 6 represents a bottom plan view of Fig. 4.
Figure 9:
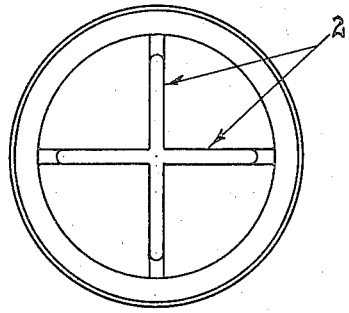
Fig. 9 represents a bottom plan view of Fig. 7.

Referring in more detail to the drawings, 1, in Fig. 1, Fig. 4 and Fig. 7, represents generally the body portion of the cup wherein the ice cream is placed. This part I may choose to make cylindrical in shape as in Fig. 1, or in the shape of a frustum of a cone as in Fig. 4, or in the shape of a frustum of a sphere as in Fig. 7. In each case this part is made large enough to accommodate the proper portion of ice cream without any of the ice cream extending over the margins, so that, in plan the entire quantity of the purchase is lodged within the confines of the cup.

4, in Fig. 1 and in Fig. 4, represents the transition portions of the cup. These portions are in the shapes of frusta of cones, and are used for the purpose of reducing from the larger diameters of the upper portions, 1, to the smaller diameters of the lower portions, 3, and to facilitate the nesting of one cup in another.

3, in Fig. 1, Fig. 4 and Fig. 7, represents generally the lower portion of the ice cream cup. This portion, 3, I may choose to make in the shapes of frusta of cones as in Fig. 1 and in Fig. 4, or in the shape of a pole section of a sphere as in Fig. 7. This lower portion is ordinarily gripped in the hand of the purchaser. In my invention I provide on this lower portion, 3, a plurality of ribs, or extensions, 2, as in Fig. 1, Fig. 4 and Fig. 7, of generally triangular shape, with the bases of the triangles lying in one horizontal plane, so that a standing base is provided upon which the cup can rest when set on a horizontal surface. In Fig. 1 and in Fig. 4, I show the triangular ribs, 2, as being triangles of greater heights and lesser bases. In Fig. 7, I may choose to make these ribs or extensions, 2, of longer bases and shorter heights. And, moreover, I may change the relative dimensions of these supporting extensions, 2, in each case, in relation to the cup, if found desirable or necessary, the drawings being mostly for illustrative purposes.

Other ribs and configurations are shown on the surfaces of the cups. These are merely for the purpose of making the cups more attractive in appearance, and to reenforce them against breakage.

Having described my invention, I claim:

A dispensing cup for ice cream, which cup is made of an edible substance comprising a cylindrical body portion, a mid-portion in the shape of a frustum of a cone, and a bottom portion formed integrally with and extending downwardly therefrom and a plurality of integrally formed triangular ribs disposed off radially with their base towards the centre of the cup and projecting downwardly so as to form a base upon which the cup can stand and a stem by which it can be held in hand substantially as set forth.

HYMAN DICKER.